No. 832,753. PATENTED OCT. 9, 1906.
H. B. SHERMAN.
HOSE CLAMP.
APPLICATION FILED JAN. 4, 1906.
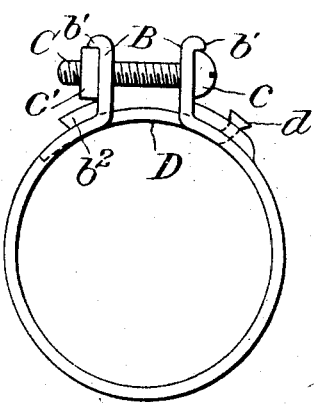
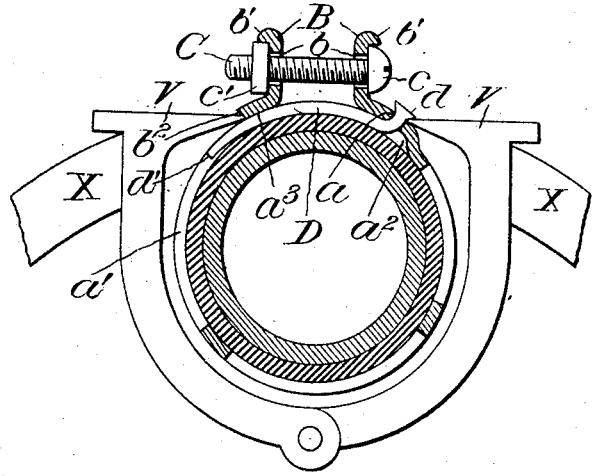
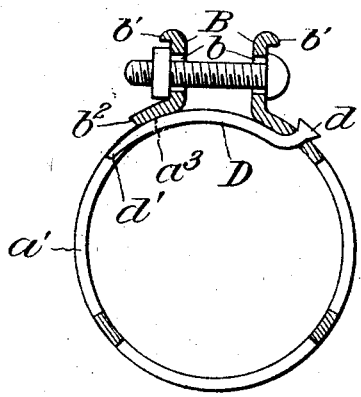
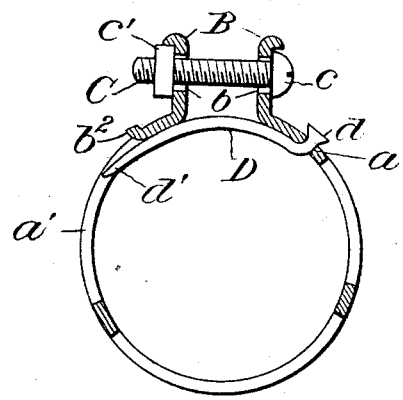
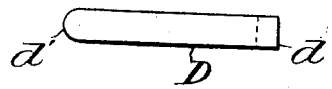
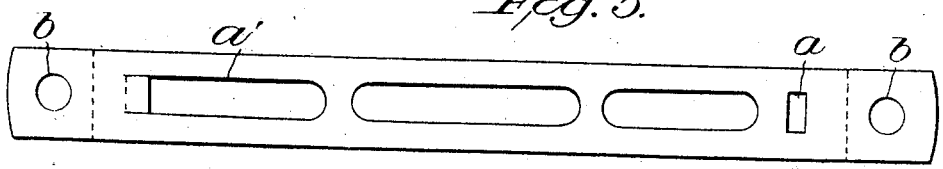
Inventor
Howard B. Sherman.
Witnesses

UNITED STATES PATENT OFFICE.

HOWARD B. SHERMAN, OF BATTLE CREEK, MICHIGAN.

HOSE-CLAMP.

No. 832,753.  Specification of Letters Patent.  Patented Oct. 9, 1906.

Application filed January 4, 1906. Serial No. 294,560.

*To all whom it may concern:*

Be it known that I, HOWARD B. SHERMAN, of Battle Creek, in the county of Calhoun and State of Michigan, have invented certain new and useful Improvements in Hose-Clamps; and I hereby declare that the following is a full, clear, and exact description thereof, reference being had to the accompanying drawings, which form part of this specification.

This invention is an improvement in hose-clamps, and in particular is an improvement upon the clamp for which Letters Patent No. 499,760 were granted to me on the 20th day of June, 1893.

The object of the present invention is to produce a clamp of more economical construction than that shown in said patent and more particularly adapted for clamping large and heavy hose.

The clamp of the present invention is preferably constructed of sheet-steel for extra heavy service and for use on extra large sizes of hose. Nevertheless, the construction is well adapted for use on smaller sizes and light-weight hose.

The present invention differs from that shown in the said patent, particularly in the mode of forming and connecting the tongue or bridge member thereto. In the present case the bridge member or tongue, which closes the space between the ends of the clamp when the same is applied to the hose, is formed separately from the band; but connected to one end thereof adjacent the ear and is made sufficiently long to bridge the space between the ears of the clamp, so that when the clamp is applied to a hose the latter will be clamped or bound uniformly around its entire circumference. The clamp is also provided at opposite sides adjacent the ears with projections on its exterior, which are adapted to be engaged by the jaws of a vise, such as are commonly employed in applying clamps to large or stiff hose, so that the latter can be securely clamped all around and the clamp held firmly in place while the fastening devices thereof are tightened, and it is necessary in applying clamps to large or stiff hose to employ such a vise in order to properly secure the clamps in place with the required tightness of grip upon the hose, so that they will withstand the heavy pressure to which they are subjected.

The present invention will be fully understood from the following description, in connection with the drawings, which show various modifications of clamps embodying the invention.

In the drawings, Figure 1 is a side view of a hose-clamp constructed in accordance with the invention. Fig. 2 is a central section therethrough, showing the auxiliary vise-jaws usually employed in applying the clamps to the hose. Figs. 3 and 4 are sectional views of slight modifications of the clamp, and Figs. 5 and 6 are detail views of the clamp-blank and tongue-blank.

The clamp comprises a strap or band made of any suitable material, but preferably steel. This strap for the purpose of lightness is preferably slotted, as shown. The slots can be readily formed by punching out portions of the band. This strap is bent into substantially circular form, and its ends are bent outwardly into opposite ears B, perforated at $b$ for the passage of a securing-bolt C, which has a head $c$ on one end and a nut $c'$ on the other. By tightening this bolt C the clamp is constricted around the hose in the usual manner. The ears B B preferably have their extremities flared outwardly, as at $b'$, to engage the nut and prevent its turning on the bolt and also to enable the nut to be placed either on the right-hand or on the left-hand side of the clamp.

One end of the strap adjacent the ear thereon is provided with an outwardly-projecting portion $b^2$, which is adapted to be engaged by one of the vise-jaws V, as indicated in Fig. 2. The other end of the strap is perforated at $a$ near the adjacent ear for the passage of the rivet end $d$ of the tongue or bridge member D, which is preferably narrower than the band and may be formed out of one of the punchings from the strap from which the clamp is formed, but of course may be formed from any suitable material. As shown, the tongue or bridge member D is curved on an arc approximating that of the main body of the clamp, and its end $d$ is turned upwardly and projected through the perforation $a$ in the clamp-band and secured by swaging or riveting the projecting portion of this end $d$ upon the outer surface of the clamp-band, so that the tongue is securely connected to the band. The tongue is sufficiently long to more than bridge the space between the ears B B when the clamp is applied to the hose, and the riveted or swaged end $d$ of the tongue forms a projection on the outer surface of the clamp for the engagement of the opposite vise-jaw V, as shown in Fig. 2.

As shown in Figs. 1 and 2, the ends of the clamp are recessed, as at $a^2$ and $a^3$, for the accommodation of the riveted and free end of the tongue D, so that the inner surface of said tongue is practically flush with the inner surface of the clamp-band. The advantage of this construction is that when the clamp is applied the free end of the tongue easily enters the recess $a^3$, and there is no tendency of the tongue to knuckle or drag on the hose, and a smoother and more uniform pressure is maintained entirely around the surface of the hose. As shown in Fig. 3, the band has only a recess $a^3$ for the free end of the tongue, and, as shown in Fig. 4, the band has no recesses; but the tongue is made long enough to reach into the end of one of the slots in the clamp-band.

As the clamp is tightened upon the hose by drawing the ears together the metal is drawn tightly into contact with the hose at all points, and this ordinarily would cause the free end of the tongue to hug so closely against the metal and the hose with which it is in contact that the tongue would be liable to buckle between the ears; but with the construction shown this is prevented, because the free end of the tongue operates in a channel or recess provided to accommodate it in the clamp-band.

In Fig. 1 the tongue lies in the channel wherever it touches the hose, both at its riveted end and at its free end. In Fig. 2 the free end of the tongue is seated in the recess, although it also projects far enough beyond this recess to enter the slot $a'$. In Fig. 3 the free end of the tongue enters the slot $a'$. The projecting part $b^2$ can be struck up from the metal of the clamp-band and the opposite projection formed by the rivet-head $d$ of the tongue D, and these projections form very useful features of the clamp.

In practice, as indicated in Fig. 2, the clamp is placed around the hose and the jaws V of the vise are engaged with the projections $b^2$ and $d$ and the vise-jaws X X are drawn together powerfully, thus constricting the clamp on the hose to any desired degree, and while thus held in the vise the bolt C is tightened, and then the vise can be relaxed and the jaws removed, leaving the clamp securely bound upon the hose. The vise-jaws shown in Fig. 2 may be of any suitable construction that is commonly used in applying large clamps to hose where it is desired to secure absolutely tight joints, as it is difficult to secure sufficient clamping merely by the use of the screw-bolt and nut. The free end of the tongue may be tapered, as shown at $d'$ in Fig. 3, so as to facilitate its sliding movement over the hose in applying the clamp. In operation the tongue closes the opening between the ears and keeps the hose from puckering. The tongue, as the ears are drawn together, would naturally force out through this opening, but being formed on an arc of a circle substantially corresponding with the curvature of the clamp it will follow down the outside of the hose into the recess or slot provided for its reception.

Having described my invention, what I claim as new, and desire to secure by Letters Patent, is—

1. A hose-clamp comprising a band having its ends bent into outwardly-projecting ears, and also having an outwardly-projecting vise-engaging portion adjacent to the ears; with a tongue having one end riveted to the opposite end of the band adjacent the ear the rivet of the tongue forming a vise-engaging projection on the exterior surface of the band, said tongue bridging the space between the ears and engaging under the opposite end of the band.

2. A hose-clamp comprising a strap-metal band having its ends bent into outwardly-projecting perforated ears, and having a struck-up projection adjacent to one of the ears for the engagement of one jaw of a clamp-tightening vise, and an opening in the other end of the band adjacent the opposite ear; with a tongue having one end secured in said opening with its extremity projecting beyond the exterior surface of the band for engagement with the other vise-jaw, said tongue extending across the space between the ears and resting under the opposite end of the band, a bolt transfixing said ears, and a retaining-nut on said bolt.

3. A hose-clamp comprising a band bent into annular form, and having its extremities bent outwardly into ears and provided with recesses in its ends adjacent the ears, a bolt, and a nut engaging the ears of the band to secure the clamp in position, and projections on the clamp adjacent the ears for the engagement of a vise; with a tongue having one end confined in one of the recesses and riveted to the band and having its body extending across the space between the ears engaging the recess in the opposite end of the band.

4. The herein-described hose-clamp comprising a slotted band bent into annular form and having its ends bent outwardly and perforated to form ears for the engagement of a fastening device, and provided with recesses in its inner side adjacent said ears, said band also having an integral projecting portion near one ear for the engagement of the vise, a bolt transfixing the said ears and provided with a nut to fasten the clamp in position, a tongue having one end secured in one of the recesses and projecting through an opening in the band and riveted thereto, the riveted end of the tongue forming a vise-engaging projection on the exterior of the band and said tongue extending across the space between the ears and entering the recess in the other end of the band.

In testimony that I claim the foregoing as my own I affix my signature in presence of two witnesses.

HOWARD B. SHERMAN.

In presence of—
WILLIAM H. HART,
WILLIAM E. WILEY.